May 28, 1968  K. WÜSTENEY ET AL  3,385,138
WORK SUPPORT FOR MULTI-STATION MACHINE TOOLS
Filed Jan. 13, 1966  9 Sheets-Sheet 1

Inventors:
Kurt Wüsteney
Otto Lehmann by Michael S. Striker
their Attorney

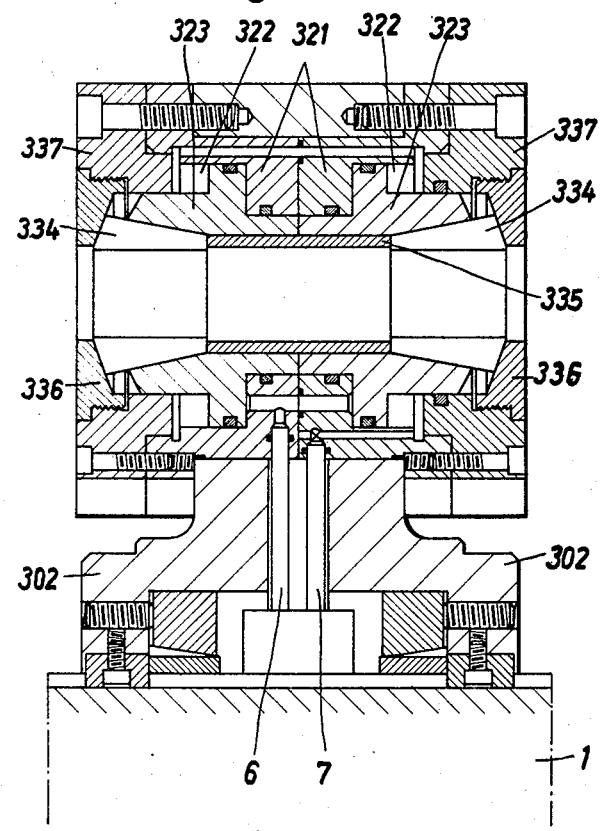

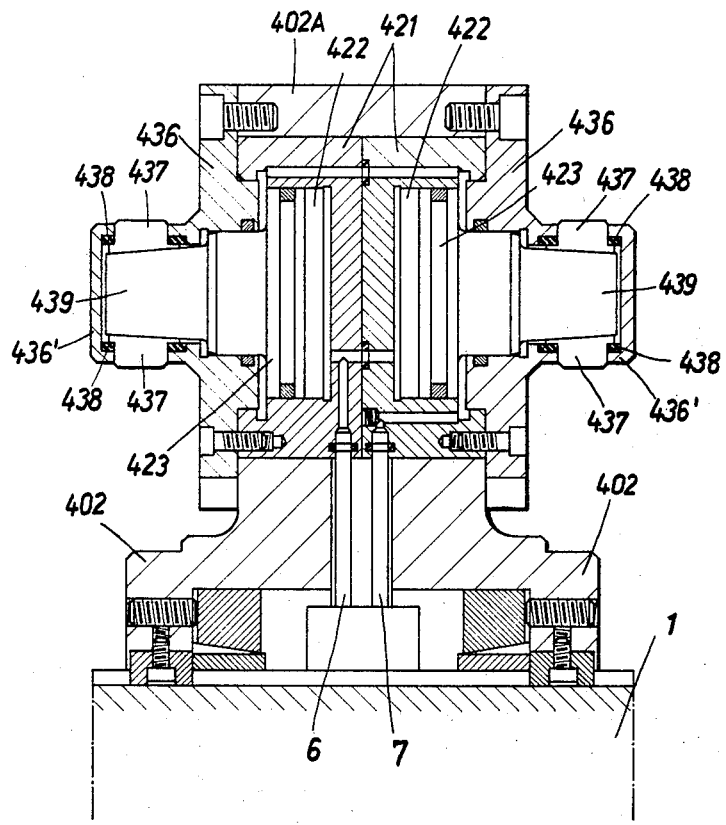

United States Patent Office 3,385,138
Patented May 28, 1968

3,385,138
WORK SUPPORT FOR MULTI-STATION MACHINE TOOLS
Kurt Wüsteney, Dutzen, uber Minden, and Otto Lehmann, Senne, Germany, assignors to Werkzeugmaschinenfabrik Gildemeister & Comp., Akt.-Ges., Bielefeld, Germany
Filed Jan. 13, 1966, Ser. No. 520,495
Claims priority, application Germany, Jan. 13, 1965, W 38,341
10 Claims. (Cl. 77—64)

ABSTRACT OF THE DISCLOSURE

A work support for an opposed-head machine tool wherein an indexible shaft supports two disks forming part of a carrier for several fluid-operated work clamping devices each of which comprises one or more pairs of work-engaging members.

---

The present invention relates to machine tools in general, and more particularly to improvements in work supports for use in double-end or opposed-head drilling, turning and analogous multi-station machine tools wherein the work support is indexible between two groups or sets of tools and comprises a plurality of work clamping or retaining devices.

In conventional multi-station machines of the type to which our present invention pertains, the work clamping devices are actuated mechanically by means of a motion transmitting rod which is mounted in the hollow shaft of the work holder. The rod transmits motion to spreading elements which in turn open and/or close the clamping jaws on the work support. A serious drawback of such machines is that the jaws invariably transmit identical clamping forces which are often too weak to insure proper retention of workpieces. On the other hand, and particularly if the machine is used for treatment of thin-walled workpieces, the closing or clamping forces transmitted by the rod to individual jaws may be excessive and can cause damage to or complete destruction of workpieces.

Accordingly, it is an important object of our invention to provide an improved work support for opposed-head multi-station machine tools and to construct and assemble the work support in such a way that its clamping or retaining devices can grip the workpieces with a controllable force to insure proper retention of and to prevent damage to workpieces.

Another object of the invention is to provide a work support which may be readily adjusted to hold large or small, symmetrical or unsymmetrical, as well as strong or thin-walled workpieces.

A further object of the invention is to provide a novel system of clamping or retaining devices which may be utilized in a work support of the above outlined characteristics.

An additional object of the invention is to provide a novel actuating system for the clamping devices of our improved work support.

Still another object of the invention is to provide a work support which can carry identically or differently configurated and/or dimensioned clamping devices.

A concomitant object of the invention is to provide a work support wherein each clamping device may be readily removed, adjusted and/or inspected independently of the other clamping devices.

Another object of the invention is to provide a work support whose clamping devices can engage and hold tubular or solid workpieces, and wherein the tubular workpieces may be held by chucks or jaws extending into or engaging the external surfaces of such workpieces.

An additional object of the invention is to provide a work support wherein each clamping device can support one or more workpieces.

Briefly stated, one feature of our present invention resides in the provision of a work support which may be installed between two sets of tool spindles in a double-end or opposed-head multi-station machine tool. The work support composes an indexible shaft, a carrier or housing mounted on and indexible with the shaft, and a plurality of fluid operated work clamping devices mounted in the carrier. Each clamping device may comprise a single cylinder and piston unit or two or more such units, and each clamping device further comprises one or more sets of chucks or analogous work engaging and retaining elements which are movable into and out of engagement with workpieces in response to axial movement of the respective pistons. The conduits which convey hydraulic or pneumatic fluid to and from the cylinder and piston units preferably extend through the bore of the indexible shaft and are provided with branches which are connected with the respective cylinders. The clamping force may be regulated by controlling the pressure of fluid which is admitted to the cylinders of individual clamping devices and/or by adjusting the position of work engaging elements with reference to the remainder of the corresponding clamping devices.

The novel features which are considered as characteristic of the invention are set forth in particular in the appended claims. The improved work support itself, however, both as to its construction and its mode of operation, together with additional features and advantages thereof, will be best understood upon perusal of the following detailed description of certain specific embodiments with reference to the accompanying drawings, in which:

FIG. 8 is a similar fragmentary axial section through a further work support; and FIG. 9 is a similar fragmentary axial section through an additional work support.

Figure 1:
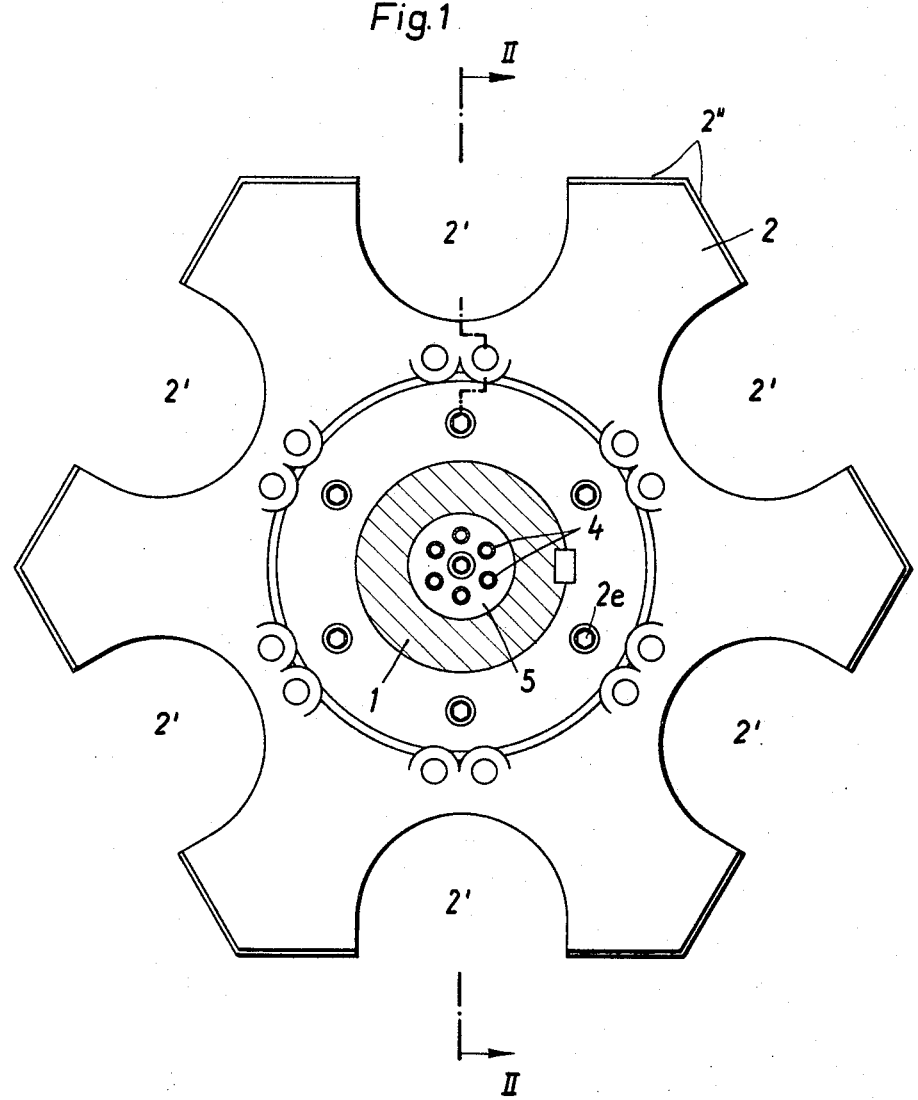
FIG. 1 is an end elevational view of a work support which embodies one form of the present invention, with the clamping devices removed.
Figure 2:
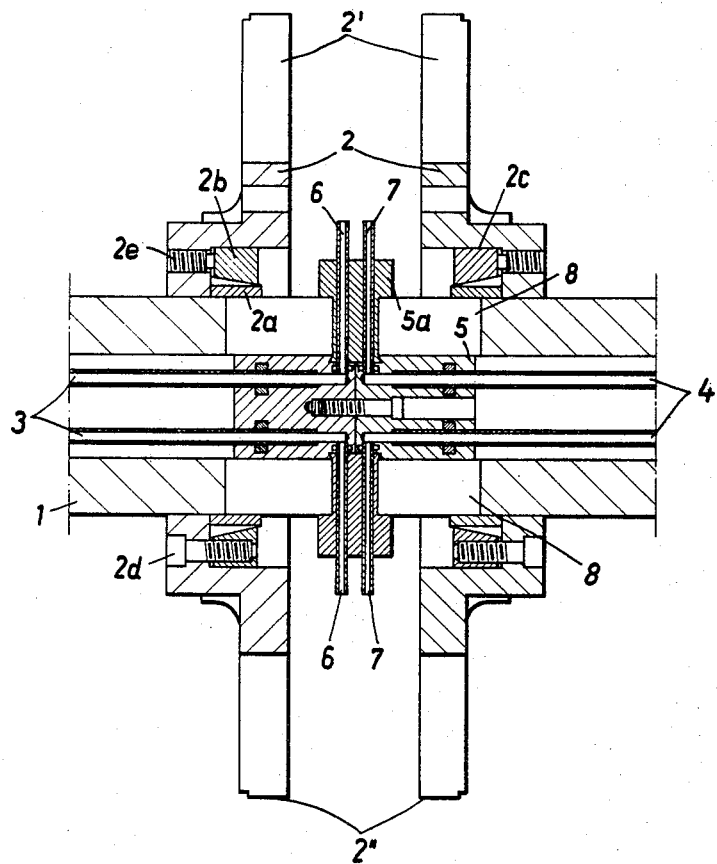
FIG. 2 is an axial section as seen in the direction of arrows from the line II—II of FIG. 1.

Referring first to FIGS. 1 and 2, there is shown a portion of an opposed-head or double-end multiple-station turning machine which comprises a work support including a hollow shaft 1 indexible to a plurality of angular positions by a mechanism which is not shown in the drawings. This shaft 1 carries a housing or carrier including two hexagonal end walls or disks 2 each of which is movable axially of but cannot rotate on the shaft 1. The exact manner in which the disks 2 may be adjusted with reference to and locked on the shaft 1 is disclosed in our copending application Ser. No. 513,709, entitled "Work Support" which is assigned to the same assignee. The means for locking the disks in selected axial positions comprises two pairs of rings, 2a, 2b which are accommodated in annular recesses 2c machined into the inner sides of the disks 2. The outer rings 2b may be shifted axially by bolts 2d, 2e.

Each disk 2 is formed with six peripheral cutouts 2' each of which is machined into one of the end faces 2" and each of which is of substantially semicircular shape. The space between the disks 2 may accommodate six clamping or retaining devices which are operated by hydraulic or pneumatic means. Each clamping device may be readily detached from the disks 2 and each such clamping device may be different from the other clamping devices.

The actuating means for the clamping devices comprises two sets of hydraulic conduits 3, 4 which extend through the interior of the shaft 1 and are connected to a composite distributor head 5 which is movable axially of the shaft. Branch conduits 6, 7 extend radially from the head 5 and through elongated slots 8 machined into the shaft 1. Such branch conduits pass through nipples 5a which are connected with the head 5 and are slidable in the respective slots 8. The shaft 1 is formed with six slots 8, one for each clamping device. The system of valves which control the flow of hydraulic pressure fluid in the parts 3-7 is not shown in the drawings. The pressure of such fluid may be regulated to thereby control the clamping force.

Figure 3:
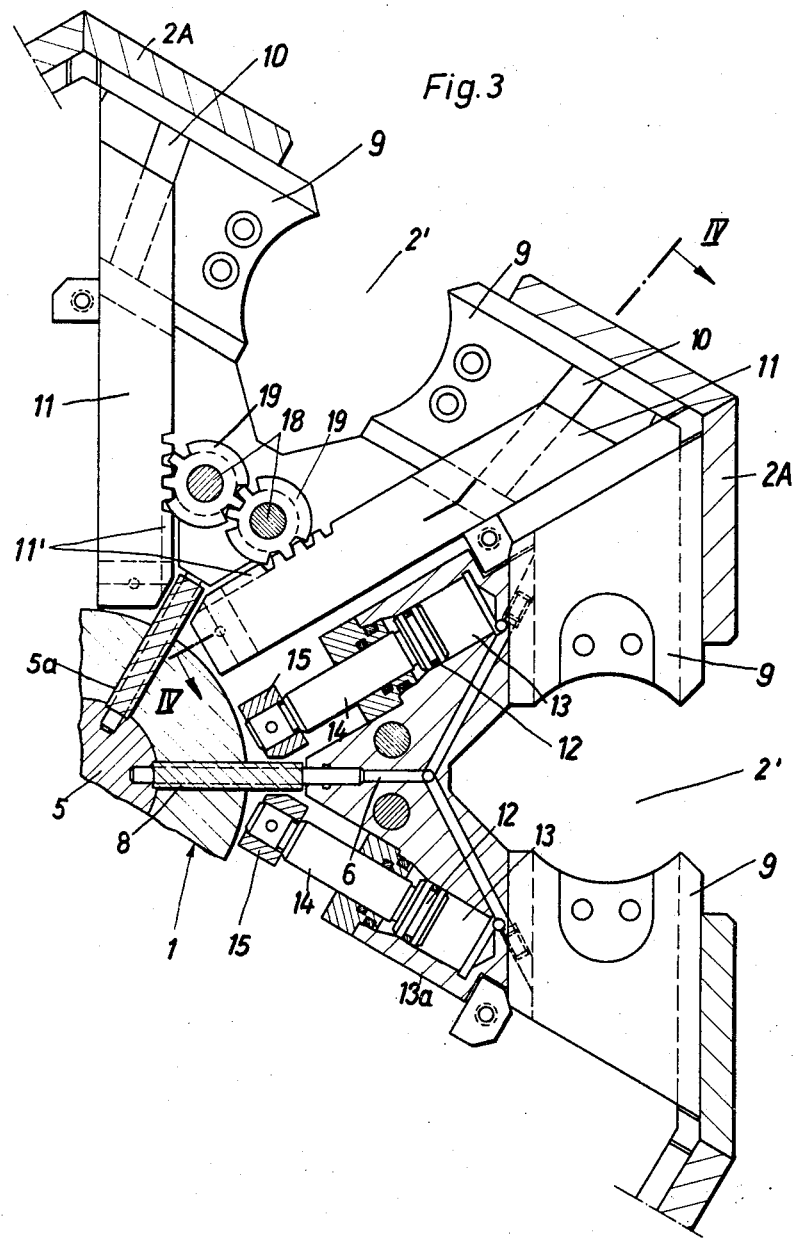
FIG. 3 is an enlarged fragmentary perspective view of the work support with the clamping devices shown in section.
Figure 4:
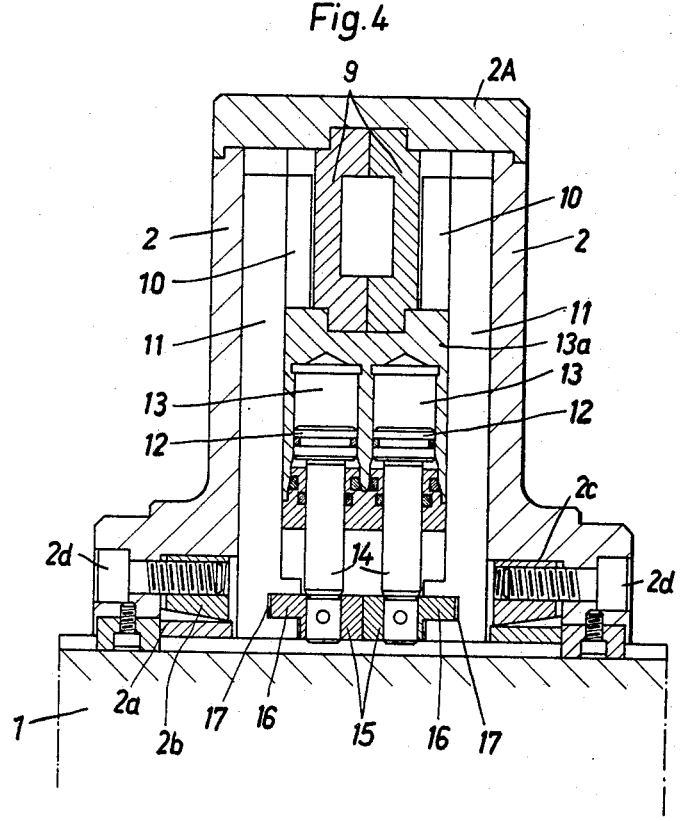
FIG. 4 is a fragmentary section as seen in the direction of arrows from the line IV—IV of FIG. 3.

FIGS. 3 and 4 illustrate a first type of clamping devices which may be utilized in the work support of our present invention. Each clamping device comprises two pairs of jaw holders 9 which are reciprocable in suitable grooves machined into the disks 2 and the holders carried by each disk can move toward or away from each other. The grooves of the disk 2 are parallel with their end faces 2". Each holder 9 can carry a clamping jaw (not shown) which may be bolted, screwed or otherwise detachably secured thereto. The holders 9 are reciprocable toward and away from each other by substantially radially extending pushers 11 through the intermediary of wedge-like cams 10. Each clamping device further comprises two pairs of pistons 12, one for each pusher 11. The pistons 12 are reciprocable in the chambers 13 of a cylinder block 13a and their piston rods 14 extend radially inwardly toward the shaft 1 and carry coupling sleeves 15 having projections 16 extending into transverse recesses 17 machined into the corresponding pushers 11. When the pistons 12 perform strokes in a direction toward the shaft 1, they entrain the pushers 11 in the same direction and the holders 9 are caused to move toward each other so that the jaws on these holders can grip a workpiece. If the pistons 12 move radially outwardly, the holders 9 and the jaws move away from each other so that the workpiece is released and may descend by gravity or is ready to be engaged and removed by a suitable transfer mechanism, not shown.

The movements of pushers 11 which form part of a clamping device are synchronized by a synchronizing unit which includes two shafts 18 each of which carries two pinions 19 meshing with toothed racks 11' on the adjoining pushers 11. The pinions 19 are in mesh so that each pusher 11 invariably moves through the same distance and in the same direction as the remaining three pushers belonging to a given clamping device. This insures that the workpieces are properly centered between the corresponding clamping jaws and are held in optimum position for engagement by drilling, turning or other tools, not shown. The ends of shafts 18 are journalled in the disks 2. The cylinders 13a are of the double-acting type. The fluid admitted by the conduits 3 and 6 will cause the pistons 12 to perform strokes in a direction toward the shaft 1 so as to bring about a clamping action. In response to admission of pressure fluid through the conduits 4 and 7, the pistons 12 will move away from the shaft 1. The holders 9 are also guided by a composite mantle 2A which is adjacent to the end faces 2" of the disks 2 and defines openings registering with the cutouts 2'. The mantle 2A forms part of a drum-shaped or turret-shaped housing or carrier which also includes the disks 2. The cylinder and piston units of the clamping devices and the synchronizing units are accommodated in the interior of this housing.

Figure 5:
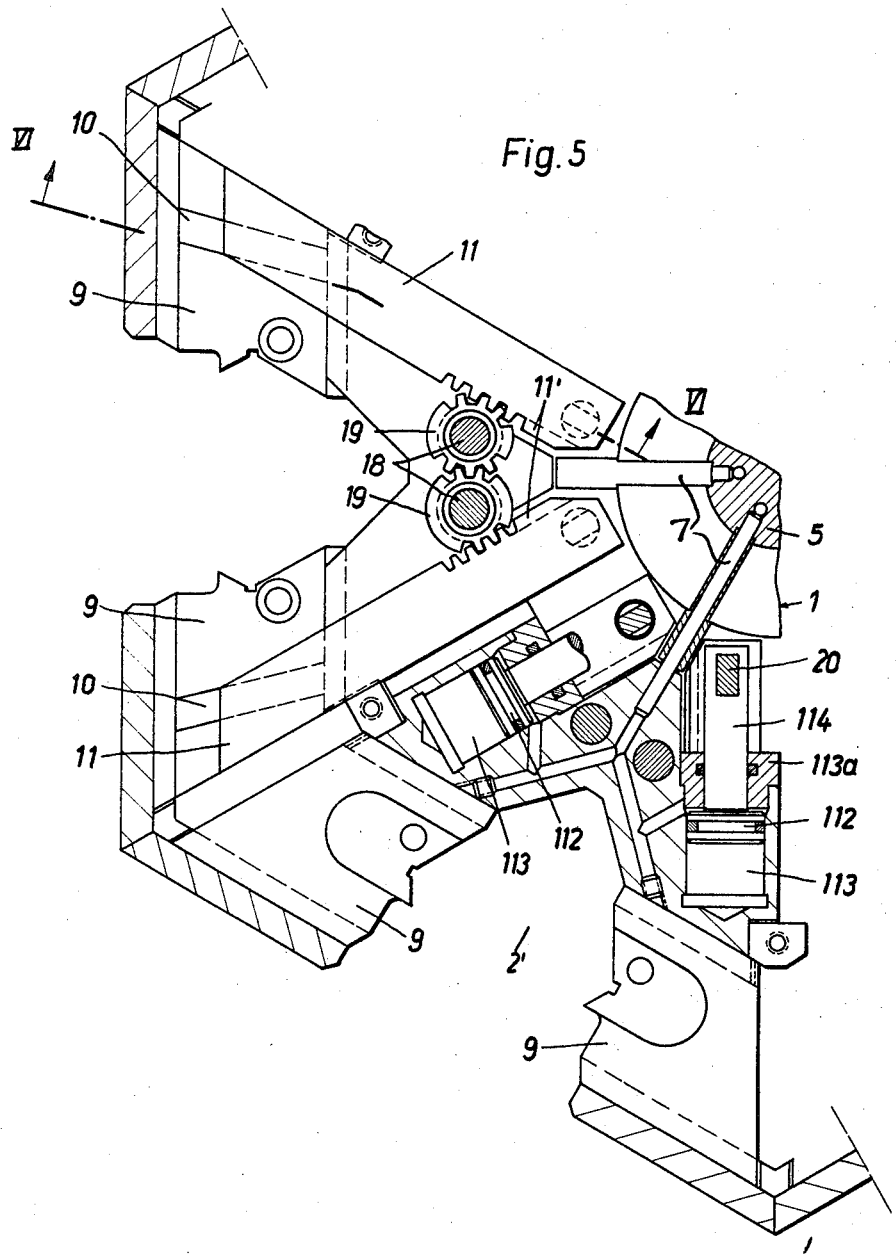
FIG. 5 is a fragmentary perspective view of a work support which carries a set of modified clamping devices.
Figure 6:
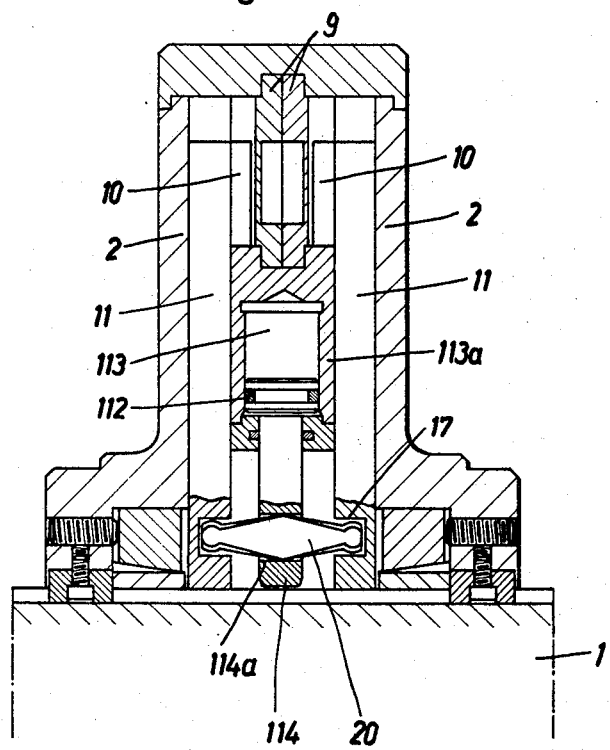
FIG. 6 is a fragmentary section as seen in the direction of arrows from the line VI—VI of FIG. 5.

FIGS. 5 and 6 illustrate a set of modified clamping devices wherein each such clamping device comprises only two pistons 112 and wherein each piston rod 114 carries a two-armed coupling element 20 extending into the recesses 17 of two aligned pushers 11. The ends of the coupling elements 20 are rounded and each of these coupling elements is tiltable in a diametral slot 114a of the respective piston rod 114. Otherwise, the construction of the clamping devices is the same as described in connection with FIGS. 3 and 4. The pistons 112 are reciprocable in chambers 113 of cylinder blocks 113a. The four pushers 11 forming part of a clamping device are coupled to each other by a synchronizing unit 11', 18, 19 shown in FIG. 5.

The heretofore described clamping devices insure that each workpiece is gripped at four points. Also, and since the jaw holders 9 are compelled to move toward and away from each other through identical distances, the clamping devices can compensate for any eventual inaccuracies in the machining of workpieces which are to be clamped thereby. The wedge-like cams 10 contribute to a self-locking action which is desirable in such types of machine tools.

Figure 7:
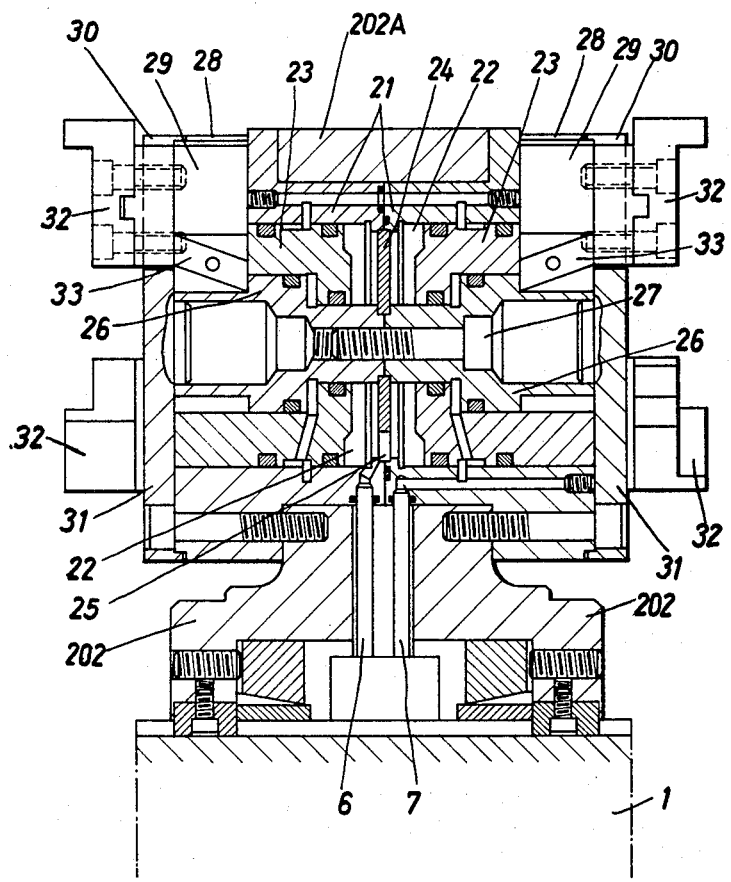
FIG. 7 is a fragmentary axial section through a modified work support which carries a third type of clamping devices.

Referring to FIG. 7, there is shown a third clamping device which comprises two mirror symmetrical housing sections 21 mounted on two end walls or disks 202 and sealingly connected with each other. The sections 21 are formed with registering cylindrical bores 22 whose axes are parallel with the axis of the shaft 1. Each of these bores receives a reciprocable annular piston 23 so that the sections 21 actually constitute two cylinders and the bores 22 provide chambers for the pistons 23. The clamping device further comprises a partition 24 which is inserted between the pistons 23 and is formed with an aperture 25 through which the bores 22 can communicate with each other. Movements of the pistons 23 in directions away from each other are limited by stops 26 which are coupled by a screw 27, the latter also serving to connect the stops 26 with the partition 24.

The outer end face of each piston 23 is formed with three recesses 28 of rectangular outline. The recesses 28 are equidistant from each other and each thereof can receive a clamping jaw 29. Thus, the jaws 29 are spaced by 120 degrees from each other, as seen in the circumferential direction of the respective piston 23. Each jaw 29 is guided in a radially extending groove 30 provided in one of two covers or rings 31 secured to the outer sides of the respective housing sections 21. Each jaw 29 carries a detachable clamping insert 32 of known design.

In the region of their recesses 28, the pistons 23 are provided with wedge-like cams 33 of strongly wear-resistant material, e.g., hardened steel, and each such cam 33 extends partially into a groove of the respective piston 23 and partially into a groove provided in the adjoining clamping jaw 29. The jaws 29 of each piston together form a chuck and the cams 33 are inclined with reference to the axis of the respective chuck in such a way that the jaws 29 and their clamping elements 32 move toward each other when the pistons 23 are shifted away from each other. When the pistons 23 move toward each other, the jaws 29 move radially outwardly.

The bores 22 receive fluid via branch conduits 6 when the pistons 23 should move axially and away from each other, i.e., when the corresponding chucks should close to grip a workpiece. The hydraulic units of the work support shown in FIG. 7 are of the double-acting type. Thus, in order to move the pistons 23 toward each other and to thereby open the chucks, the branch conduits 6 are connected to a return line and the branch conduits 7 admit compressed fluid to the outer sides of the pistons 23.

The work support of FIG. 7 can hold twelve workpieces at a time, it being assumed that the housing or carrier including the disks 202 accommodates six equidistant clamping devices. The housing or carrier of this work support further includes a mantle 202A.

In FIG. 8, the housing sections or cylinders 321 are provided with registering bores 322 for two annular pistons 323 each of which is movable axially to perform relatively short strokes. The pistons 323 are formed with internal conical surfaces and each thereof can accommodate a chuck 334 of known design. The two chucks 334 shown in FIG. 8 are separated from each other by a sleeve-like stop 335. This stop cooperates with caps 336 which are screwed into covers or rings 337 to hold the chucks against axial movement. The rings 337 are bolted to the housing sections 321.

When the branch conduits 6 admit a pressure fluid, the pistons 323 move away from each other and the chucks 334 are caused to contract so as to grip a pair of cylindrical workpieces which are introduced through the caps 336. Alternatively, the two chucks 334 will grip an elongated workpiece which extends through the sleeve-like stop 335. If the fluid is permitted to escape through the branch conduit 6 while the branch conduit 7 admits pressure fluid to the outer sides of the pistons 323, the pistons move toward each other and the chucks 334 release the workpiece. The cylinder and piston units 321, 323 are mounted on the disks 302.

Referring finally to FIG. 9, there is shown a portion of a further work support adapted to be utilized for clamping of tubular workpieces which must be held from the inside. The bores 422 of housing sections or cylinders 421 receive pistons 423 and the outer sides of these sections carry ring-shaped covers 436 having hollow extensions 436' provided with equidistant slots for clamping elements 437. Each of these clamping elements is biased radially inwardly by an elastic ring 438 which maintains it in abutment with a conical spreading portion 439 forming part of the corresponding piston 423.

When the branch conduit 6 admits pressure fluid and the branch conduit 7 discharges into a return line, the pistons 423 move away from each other and their conical spreading portions 439 cause the clamping elements 437 to move radially outwardly and to engage the internal surfaces of tubular workpieces which surround the extensions 436'.

When the flow of fluid is reversed, i.e., when the branch conduit 7 admits pressure fluid, the pistons 423 are caused to move toward each other and the elastic rings 438 are free to move the clamping elements 437 radially inwardly so that the workpieces may be slipped off the extensions 436'. The housing or carrier of the work support shown in FIG. 9 comprises two end walls or disks 402 which are connected with the sections 421, and a mantle 402A.

It is clear that each of FIGS. 7 to 9 shows only one clamping device of the respective work support. For example, the work support of FIG. 9 may comprise four, five, six or more pairs of pistons 423 and can support a plurality of workpieces whose number equals the number of pistons. In other words, this work support also comprises clamping devices each of which can engage two workpieces at a time.

Without further analysis, the foregoing will so fully reveal the gist of the present invention that the others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A work support comprising an indexible shaft; a carrier supported by and indexible with said shaft and comprising two axially spaced end walls each having a plurality of peripheral cutouts; and a plurality of fluid-operated work clamping devices mounted on said carrier and each comprising two pairs of jaw holders, the jaw holders of each pair being spaced in axial alignment parallel to said shaft and being reciprocably mounted on one of said end walls at the opposite sides of the respective cutout, and at least one cylinder and piston unit for moving the jaw holders of each pair with reference to each other.

2. A work support comprising an indexible shaft; a carrier supported by and indexible with said shaft; and a plurality of fluid-operated work clamping devices mounted on said carrier and each comprising a pair of coaxial annular pistons parallel with said shaft and movable toward and away from each other, double-acting cylinders for said pistons, and annular chucks received in said pistons and arranged to clamp or release a workpiece extending therethrough in response to axial displacement of said pistons.

3. A work support comprising an indexible shaft; a carrier supported by and indexible with said shaft; and a plurality of fluid-operated work clamping devices mounted on said carrier and each comprising a pair of coaxial pistons parallel with said shaft and movable toward and away from each other, double-acting cylinders for said pistons, a set of clamping elements for each of said pistons, said clamping elements being movable radially of the respective pistons, and means for moving said clamping elements radially in response to axial movements of said pistons.

4. A work support as set forth in claim 1, further comprising means for synchronizing movements of said holders in each of said clamping devices so that the jaw holders of each pair can move to the same extent.

5. A work support comprising an indexible shaft; a carrier supported by and indexible with said shaft, said carrier comprising two axially spaced end walls of polygonal outline, each of said end walls having end faces provided with cutouts; and a plurality of fluid-operated work clamping devices mounted on said carrier, each of said clamping devices comprising at least two jaw holders reciprocably mounted in grooves provided in at least one of said end walls in parallelism with an end face and located at the opposite sides of the respective cutout, at least one cylinder and piston unit, pushers movable substantially radially of said shaft, cams for shifting the holders in response to reciprocation of the pushers, and coupling elements for transmitting motion from the piston of said unit to said pushers.

6. A work support comprising an indexible shaft; a carrier supported by and indexible with said shaft, said carrier comprising two axially spaced end walls having a plurality of peripheral cutouts; and a plurality of fluid-operated work clamping devices mounted on said carrier, each clamping device comprising two pairs of jaw holders with each pair reciprocably mounted on one of said end walls, the jaw holders of each pair being located at the oppostie sides of the respective cutout, a cylinder and piston unit for each of said pairs of holders for moving said holders with reference to each other, coupling elements for transmitting motion from the pistons of said units to the respective pairs of holders, and four pushers movable substantially radially of said shaft and each arranged to transmit motion to one of said holders, said coupling elements comprising two-armed levers fulcrumed in the piston rods of the respective pistons and having end portions extending into recesses provided in the corresponding pairs of pushers.

7. A work support as set forth in claim 5, wherein each of said pushers is provided with a toothed rack and further comprising pinions meshing with said racks to synchronize the movements of all holders forming part of a given clamping device.

8. A work support as set forth in claim 1, wherein each of said clamping devices comprises a plurality of pistons, one for each of said jaw holders.

9. A work support as set forth in claim 1, wherein each clamping device comprises a piston for each pair of jaw holders, and coupling elements for transmitting motion from each piston to the respective pair of jaw holders.

10. A work support as set forth in claim 3, wherein each of said clamping devices further comprises resilient means for biasing said clamping elements radially inwardly.

References Cited

UNITED STATES PATENTS

| 2,308,099 | 1/1943 | Obecny | 77—63 |
| 2,854,240 | 9/1958 | Parker et al. | 279—4 XR |
| 2,873,628 | 2/1959 | Stuart | 77—21 |
| 2,949,313 | 8/1960 | Moser et al. | 279—4 XR |
| 3,226,742 | 1/1966 | Gnutti | 10—107 XR |

FRANCIS S. HUSAR, *Primary Examiner.*